(12) United States Patent
Kadota

(10) Patent No.: US 10,631,150 B2
(45) Date of Patent: Apr. 21, 2020

(54) COMMUNICATION APPARATUS, INFORMATION PROCESSING APPARATUS, AND CONTROL METHODS

(71) Applicant: CANON KABUSHIKI KAISHA, Tokyo (JP)

(72) Inventor: Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/014,411

(22) Filed: Jun. 21, 2018

(65) Prior Publication Data

US 2019/0007814 A1     Jan. 3, 2019

(30) Foreign Application Priority Data

Jun. 28, 2017   (JP) ................. 2017-126520

(51) Int. Cl.
*H04W 4/80* (2018.01)
*H04L 29/08* (2006.01)
(Continued)

(52) U.S. Cl.
CPC ........... *H04W 4/80* (2018.02); *H04L 67/1097* (2013.01); *H04L 67/303* (2013.01); *H04L 67/32* (2013.01); *H04L 67/42* (2013.01); *H04L 69/22* (2013.01); *H04W 8/005* (2013.01); *H04W 76/14* (2018.02); *H04W 84/18* (2013.01)

(58) Field of Classification Search
CPC ....... H04W 4/80; H04W 8/005; H04W 76/14; H04W 84/18; H04L 67/32; H04L 67/42; H04L 67/1097; H04L 69/22; H04L 67/303

See application file for complete search history.

(56) References Cited

U.S. PATENT DOCUMENTS 9,176,697 B2    11/2015 Kadota
2016/0353233 A1*  12/2016 Yong ................... H04W 76/10
(Continued)

FOREIGN PATENT DOCUMENTS

JP   2006-132152 A   5/2006
JP   2013172259 A    9/2013
(Continued)

OTHER PUBLICATIONS

Japanese Office Action dated Nov. 29, 2019 in corresponding Japanese Application No. 2017-126520.

*Primary Examiner* — Brian D Nguyen
(74) *Attorney, Agent, or Firm* — Venable LLP

(57) ABSTRACT

A communication apparatus that can perform wireless communication with an information processing apparatus saves data accessible based on an instruction from an information processing apparatus, executes, in a case where predetermined information based on a write instruction from the information processing apparatus to a predetermined area in the data is saved, predetermined processing related to wireless communication based on an execution request for the predetermined processing from the information processing apparatus, and does not execute, in a case where the predetermined information is not saved, the predetermined processing related to wireless communication even if the execution request for the predetermined processing from the information processing apparatus has been received.

15 Claims, 12 Drawing Sheets

(51) Int. Cl.
*H04W 76/14* (2018.01)
*H04L 29/06* (2006.01)
*H04W 8/00* (2009.01)
*H04W 84/18* (2009.01)

(56) References Cited

U.S. PATENT DOCUMENTS

| | | | |
|---|---|---|---|
| 2016/0373918 A1* | 12/2016 | Livezey, Jr. | H04W 4/80 |
| 2016/0381637 A1* | 12/2016 | Kvetny | H04L 67/28 |
| | | | 370/311 |
| 2017/0134596 A1 | 5/2017 | Sato et al. | |
| 2017/0295539 A1* | 10/2017 | Gu | H04L 61/6022 |
| 2018/0077535 A1* | 3/2018 | Todeschini | H04W 40/244 |
| 2018/0091932 A1* | 3/2018 | Kwon | H04W 12/003 |
| 2018/0352312 A1* | 12/2018 | Kwon | H04Q 9/04 |

FOREIGN PATENT DOCUMENTS

| | | |
|---|---|---|
| JP | 2016-046762 A | 4/2016 |
| JP | 2016-144025 A | 8/2016 |
| JP | 2016150484 A | 8/2016 |
| JP | 2017091188 A | 5/2017 |
| JP | 2017092645 A | 5/2017 |
| JP | 2019-507971 A | 3/2019 |
| WO | 2017/106258 A1 | 6/2017 |

\* cited by examiner

FIG. 5

| Service UUID | Service NAME | Characteristic UUID | Characteristic NAME | Service READ AVAILABILITY | Service WRITE AVAILABILITY | Characteristic READ AVAILABILITY | Characteristic WRITE AVAILABILITY | VALUE |
|---|---|---|---|---|---|---|---|---|
| 0x180A | Device Information | 0x2A29 | Manufacturer Name String | ○ | | ○ | | Printer Device |
| | | 0x2A24 | Hardware Revision String | ○ | | ○ | | 1010_AAA |
| | | 0x2A25 | Firmware Revision String | ○ | | ○ | | 2030000 |
| | | 0x2A26 | Software Revision String | ○ | | ○ | | 0001 |
| 00000000-0000-1000-1000-00405f9b34fb | IJ Original | 00000000-0000-2000-1000-00405f9b34fb | SSID | ○ | ○ | ○ | | PrinterSSID |
| | | 00000000-0000-2000-1000-00405f9b34fc | PASSWORD | ○ | ○ | ○ | | aaaabbbb |
| | | 00000000-0000-2000-1000-00405f9b34fd | APPARATUS NAME AREA | ○ | ○ | | ○ | |

FIG. 6

| OFFSET | DESCRIPTION | | VALUE |
|---|---|---|---|
| 0 | HEADER PORTION | | ' ' |
| 1 | | | ' ' |
| 2 | | | ' ' |
| 3 | | | ' ' |
| 4 | | | ' ' |
| 5 | | | ¥0 |
| 6 | COMMAND PORTION | SIZE | 0x05 |
| 7 | | | 0x00 |
| 8 | | COMMAND | 'D' |
| 9 | | | 'D' |
| 10 | | | 'D' |
| 11 | | | 'D' |
| 12 | | | ¥0 |
| 13 | DATA PORTION | SIZE | 0x1d |
| 14 | | | 0x00 |
| 15 | | ARBITRARY DATA | ARBITRARY |
| 16 | | | ARBITRARY |
| ... | | | ⋮ |
| 42 | | | ARBITRARY |
| 43 | | | ¥0 |
| 44 | FOOTER PORTION | | 'B' |
| 45 | | | 'B' |
| 46 | | | 'B' |
| 47 | | | ¥0 |

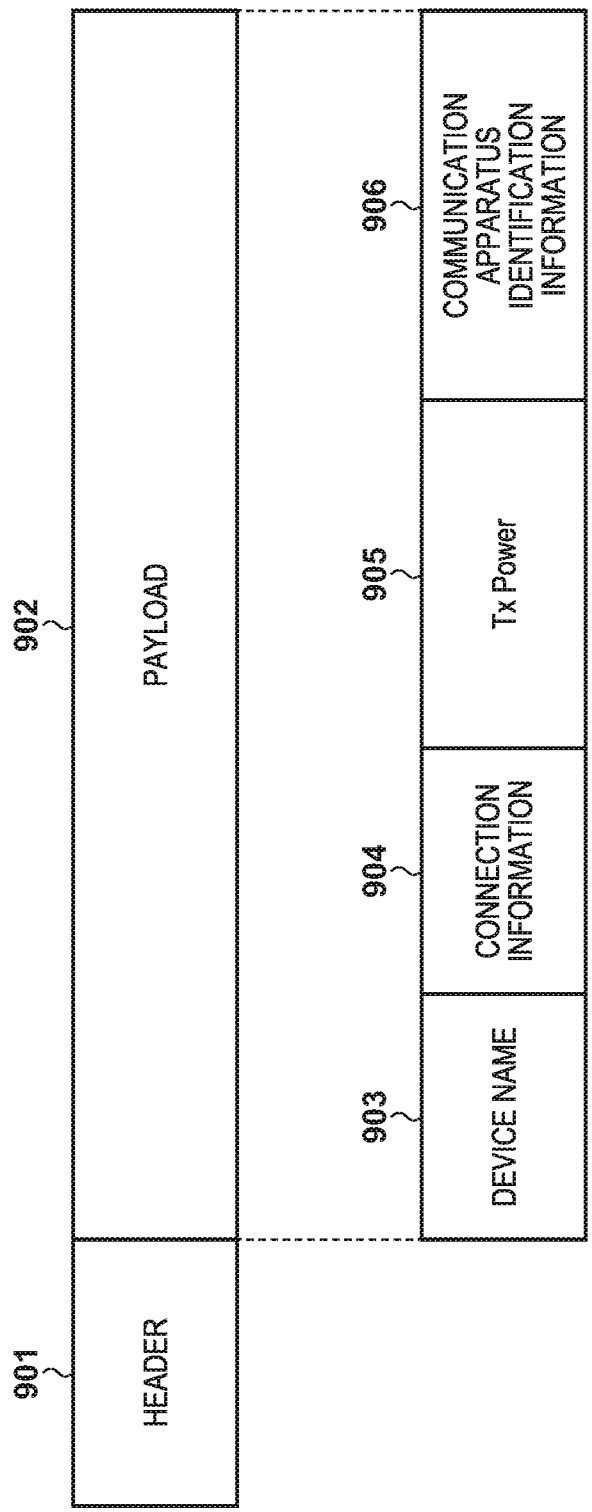

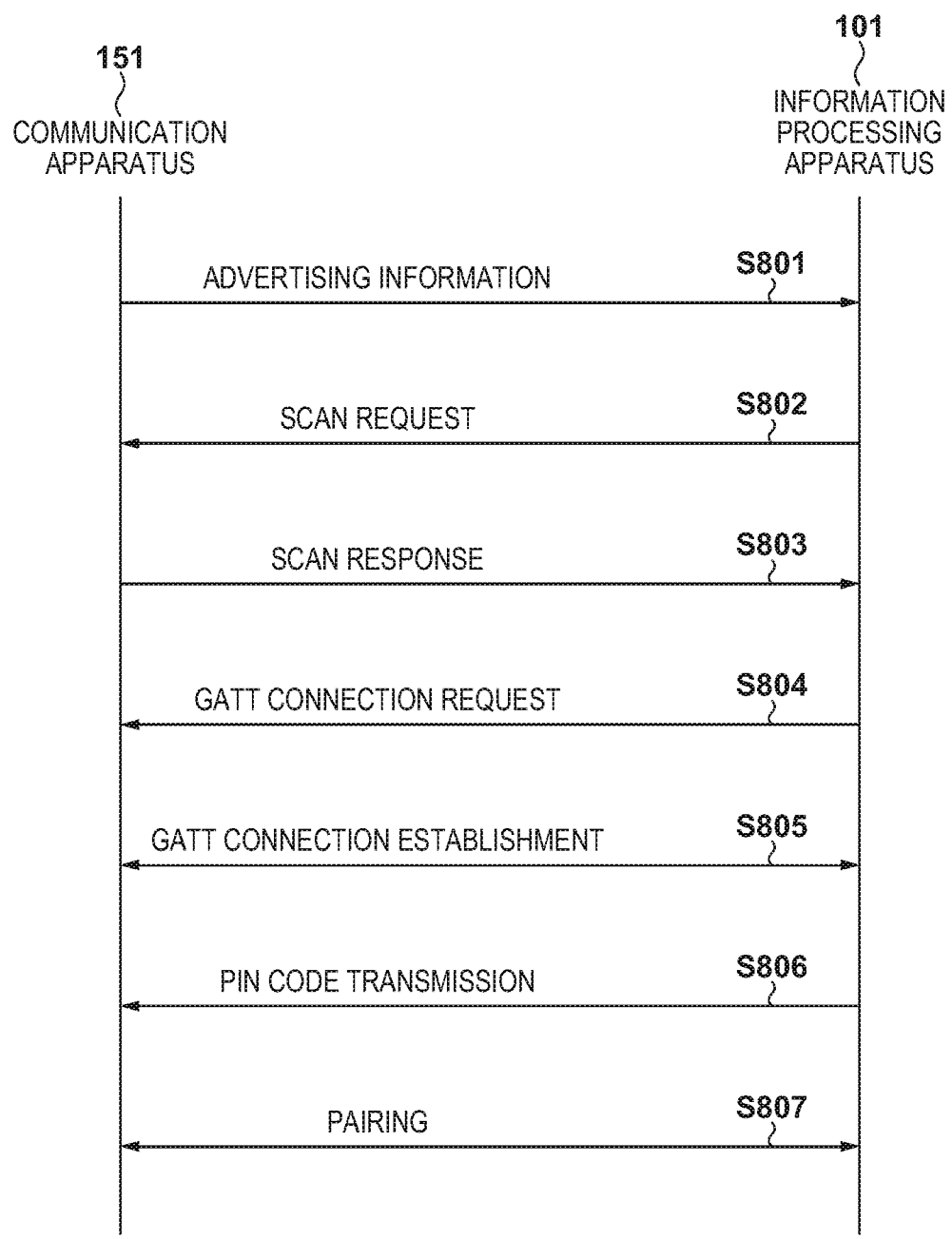

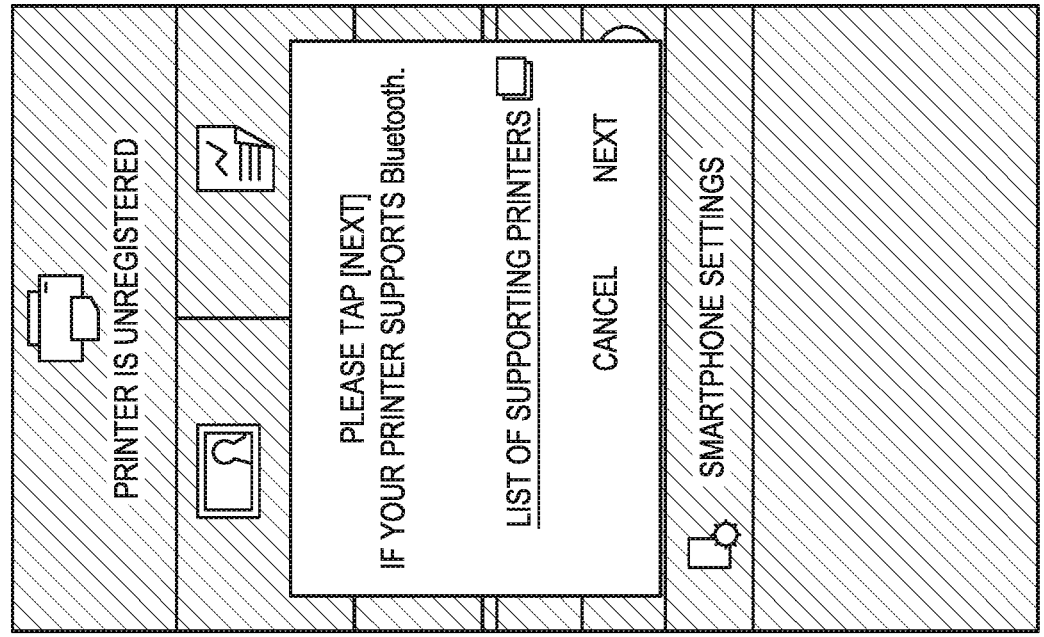
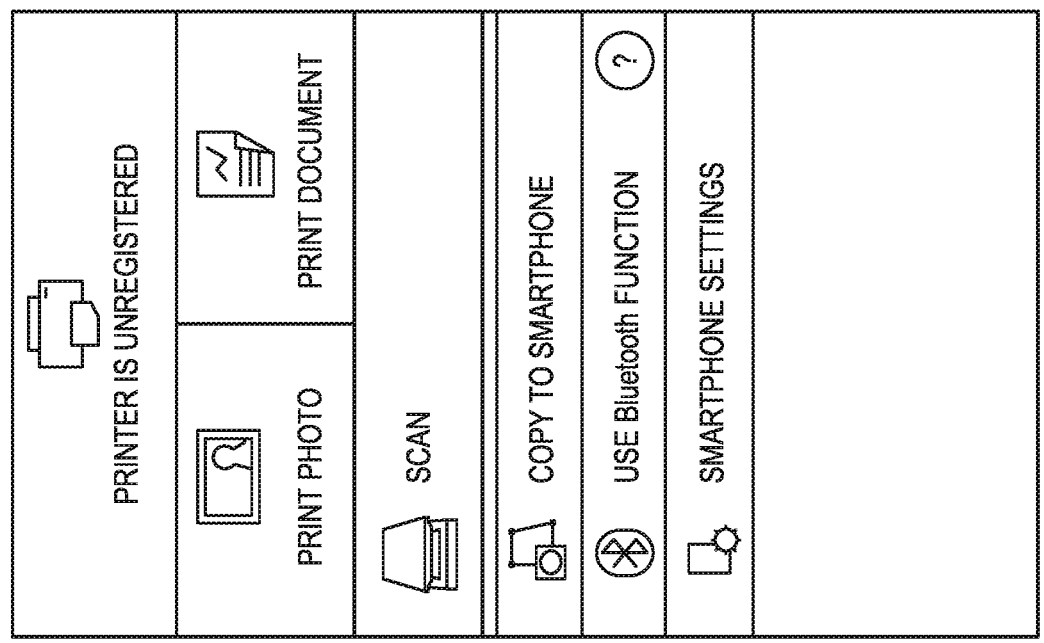

FIG 9F

PAIRING

TAP [NEXT] TO SELECT THE FOLLOWING PRINTER NAME AND INPUT THE SIX DIGIT NUMERAL DISPLAYED ON THE PRINTER WITHIN 30 SEC.

XK70-K8-2

NEXT

FIG 9E

PAIRING

PLEASE TURN ON THE POWER OF YOUR PRINTER. PLEASE WAIT UNTIL THE NAME OF YOUR PRINTER IS DISPLAYED AND SELECT YOUR PRINTER.

- ts6120
- a2460
- TS6100 1178
- XK70-K8-2
- XK50-K8-2
- TR7520-mt12
- XK50 series
- R32MT1314

SEARCHING FOR OTHER PRINTERS...

IF YOU CANNOT FIND YOUR PRINTER

FIG. 9G 1001g

PLEASE SELECT XK70-K8-2.

MY DEVICE
SC-04E_1668
☐ SESSION UNDISCLOSED TO OTHER DEVICES
(TAP HERE TO DISCLOSE YOUR TERMINAL TO NEARBY DEVICES)

CONNECTION AVAILABLE      SCANNING...
DEVICES

▨ △  TR7520-mt12

▨ △  XK50-K8-2

▨ △  XK70-K8-2

▨ △  ts6120

STOP

FIG. 9H 1001h

PLEASE INPUT THE SIX DIGIT NUMERAL AND TAP [OK].

PAIRING WITH
XK70-X8-2:

PLEASE INPUT THE PIN OF THIS DEVICE.

_____
(TRY 0000 OR 1234)

CANCEL        OK

| 1 | 2 | 3 | 4 | 5 | 6 | 7 | 8 | 9 | 0 |

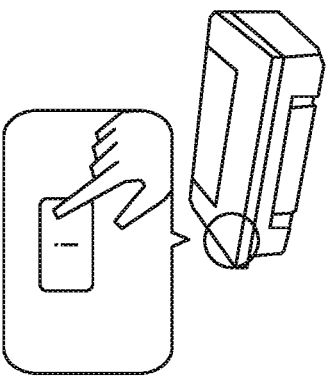

COMMUNICATION APPARATUS, INFORMATION PROCESSING APPARATUS, AND CONTROL METHODS

BACKGROUND OF THE INVENTION

Field of the Invention

The present invention relates to a connection control technique related to wireless communication.

Description of the Related Art

In recent years, electronic devices that have a short-range wireless communication function which uses Bluetooth® have become popular. For example, Bluetooth may be used for communication between an information processing apparatus such as a smartphone and a communication apparatus such as a printer. When performing short-range wireless communication by Bluetooth, an electronic device executes pairing with a communication partner as preparation processing to shift to a state that allows communication with the communication partner.

Here, when an electronic device executes pairing with another arbitrary apparatus and changes to a state that allows communication by Bluetooth, the electronic device may change, in some cases, to a state in which operations from other arbitrary apparatuses are accepted. To solve this, Japanese Patent Laid-Open No. 2016-150484 discloses a method that restricts pairing by permitting a pairing request only when setting information that has been preset and a part of request source information included in a Bluetooth pairing request match. According to this method, for example, a character string called "device" can be preset as the setting information so pairing will not be performed with an apparatus when the name of the apparatus that transmitted the pairing request does not include "device".

SUMMARY OF THE INVENTION

In the method disclosed in Japanese Patent Laid-Open No. 2016-150484, only the setting information that has been preset and a part of the request source information included in the pairing request are compared. Hence, when there are few pieces of information set in the setting information (for example, when the length of the preset character string is short), the apparatus that is to serve as a connection target based on pairing cannot be appropriately restricted, and pairing with another apparatus may be unexpectedly permitted in some cases.

The present invention provides a technique for appropriately restricting a partner apparatus that is to serve as the connection target.

According to one aspect of the present invention, there is provided a communication apparatus that can perform wireless communication with an information processing apparatus, comprising: a communication unit configured to perform wireless communication; a saving unit configured to save data accessible based on an instruction from the information processing apparatus; and a control unit configured to control the communication unit, wherein in a case where predetermined information based on a write instruction from the information processing apparatus to a predetermined area in the data is saved in the saving unit, the control unit controls the communication unit to execute predetermined processing related to wireless communication based on an execution request for the predetermined processing from the information processing apparatus, and in a case where the predetermined information is not saved in the saving unit, the control unit controls the communication unit so as not to execute the predetermined processing related to the wireless communication even if the execution request for the predetermined processing has been received from the information processing apparatus.

According to another aspect of the present invention, there is provided an information processing apparatus that can perform wireless communication with a communication apparatus, comprising: a communication unit configured to perform wireless communication; and a control unit configured to control the communication unit, wherein the control unit controls the communication unit so as to execute a write instruction to a predetermined area in data saved in the communication apparatus accessible based on an instruction from the information processing apparatus, and the control unit controls, after the write instruction, the communication unit so as to transmit, to the communication apparatus, an execution request for predetermined processing related to wireless communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a table showing an example of GATT data;

FIG. 6 is a view showing an example of the format of values which are to be written in an apparatus name area;

FIG. 7 is a view showing an example of the structure of advertising information;

FIG. 8 is a sequence chart for explaining the outline of a processing procedure performed until the pairing of apparatuses; and FIGS. 9A to 9J are views showing examples of screens which are to be displayed.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Communication System)

Figure 1:
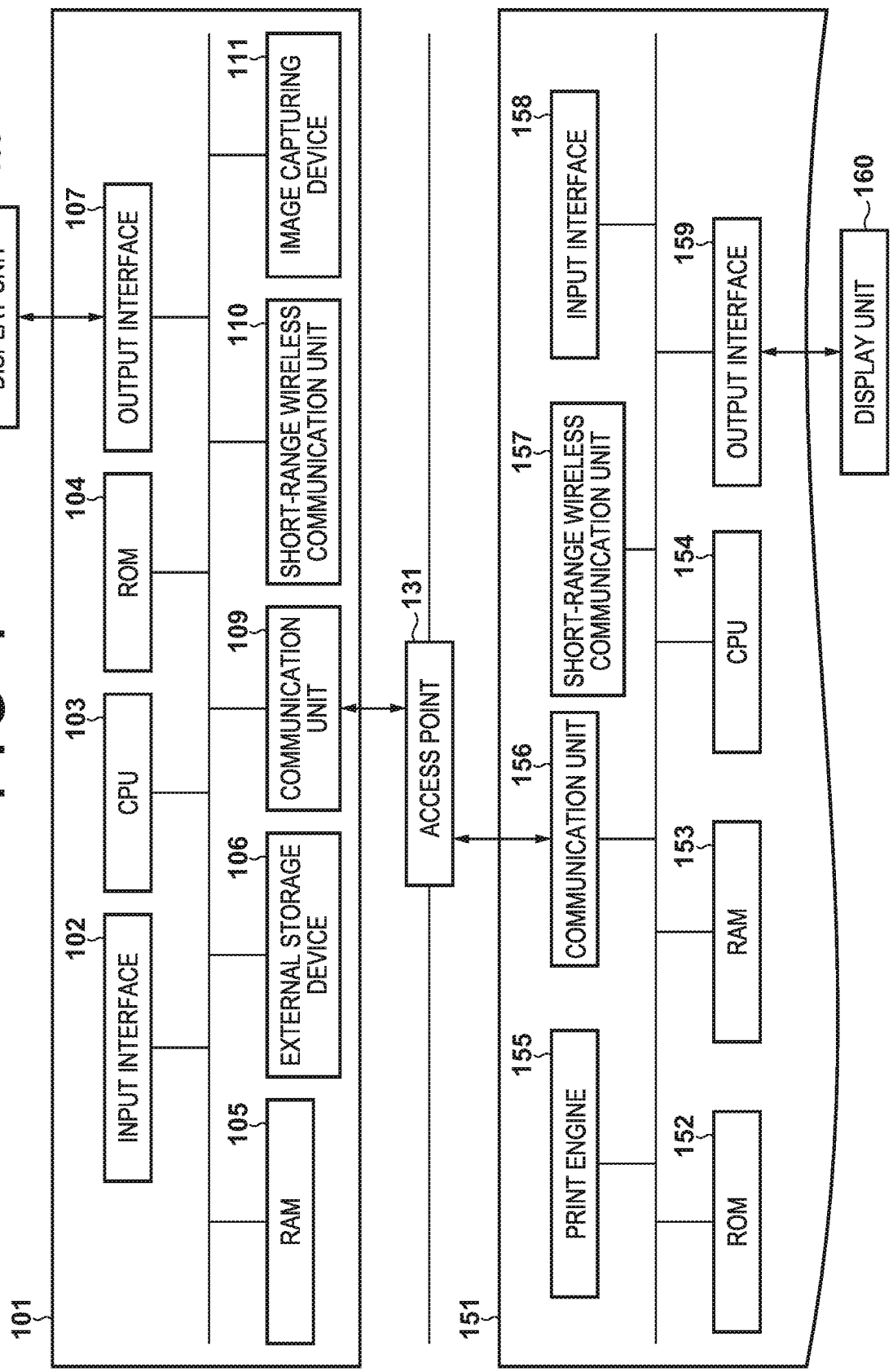
FIG. 1 is a block diagram showing an example of the arrangement of apparatuses in a communication system.

FIG. 1 shows an example of the arrangement of a communication system and apparatuses in the system according to this embodiment. The communication system is formed by, for example, an information processing apparatus 101, an access point 131, and a communication apparatus 151. The information processing apparatus 101 is, for example, an arbitrary information processing apparatus such as a smartphone, a mobile terminal, a notebook PC (Personal Computer), a tablet terminal, a PDA (Personal Digital Assistant), a digital camera, or the like. Assume that the information processing apparatus 101 is a smartphone hereinafter. The communication apparatus 151 is, for example, a printer, but can be an arbitrary electronic device capable of performing wireless communication with the information processing apparatus 101. For example, the communication apparatus 151 may be a copying apparatus, a facsimile apparatus, a mobile terminal, a smartphone, a notebook PC, a tablet terminal, a PDA, a digital camera, a music playback device, or a television. The communication apparatus 151 may be a multi-function peripheral that has a plurality of functions such as a copy function, a FAX function, a print function, and the like. Assume that the communication apparatus 151 is a printer such as an inkjet printer, a full-color laser beam printer, a monochrome printer, or the like hereinafter.

The information processing apparatus 101 includes, in one example, an input interface 102, a CPU 103, a ROM 104, a RAM 105, an external storage device 106, an output interface 107, a communication unit 109, a short-range wireless communication unit 110, and an image capturing device 111. Note that these blocks are connected to each other by using, for example, an internal bus. CPU, ROM, and RAM are acronyms of Central Processing Unit, Read Only Memory, and Random Access Memory, respectively. Although it is shown as if a display unit 108 (external display device) is present outside the information processing apparatus 101 in FIG. 1, the display unit 108 may be a display incorporated in the information processing apparatus 101. Note that the arrangement of these blocks is merely an example, and the information processing apparatus 101 may include blocks other than those shown in FIG. 1. The plurality of blocks shown in FIG. 1 may be integrated into a single block or a single block may be divided into two or more blocks. That is, the information processing apparatus 101 can have an arbitrary arrangement within the range in which processing, which is to be described later, can be executed.

The CPU 103 is a system control unit and controls the overall information processing apparatus 101. The ROM 104 stores fixed data such as control programs and data tables to be executed by the CPU 103, an embedded OS (Operating System) program, and the like. In this embodiment, each control program stored in the ROM 104 is used to perform, under the management of the embedded OS stored in the ROM 104, software execution control such as scheduling, task switching, interrupt processing, and the like. The RAM 105 is formed from, for example, an SRAM (Static RAM) requiring a backup power supply. Note that since data is held by a primary battery for data backup (not shown), the RAM 105 can store data such as program control variables and the like without volatilizing them. A memory area that stores the setting information of the information processing apparatus 101, the management data of the information processing apparatus 101, and the like is also arranged in the RAM 105. The RAM 105 is also used as the main memory and the work memory of the CPU 103. The external storage device 106 stores an application (to be referred to as a "print application" hereinafter) that provides a print execution function. The external storage device 106 stores various kinds of programs such as a print information generation program for generating print information interpretable by the communication apparatus 151, an information transmission/reception control program for exchanging information with the communication apparatus 151 which is connected via the communication unit 109, and the like. The various kinds of information to be used by these programs and image data obtained from other information processing apparatuses or the Internet via the communication unit can be saved in the external storage device 106.

The input interface 102 is an interface for accepting data inputs and operation instructions from a user and is formed from a physical keyboard, buttons, and the like. The output interface 107 is an interface that performs control to cause the display unit 108 to display data and perform notification of the state of the information processing apparatus 101. The display unit 108 is formed from an LED (light emitting diode), LCD (liquid crystal display), and the like, displays data, and notifies the user of the state of the information processing apparatus 101. Note that the input interface 102 for accepting an operation from the user and the output interface 107 (and the display unit 108), to be described later, for screen output may be implemented by a single device such as a touch panel. For example, a software keyboard including keys such as numerical value input keys, a mode setting key, an enter key, a cancel key, and a power key may be displayed on the display unit 108 so that an input from the user can be accepted via the display unit 108. Note that the output interface 107 may perform control to cause an output unit (not shown) to present information by sound output and vibration output.

The communication unit 109 is formed from a circuit and an antenna for performing communication in accordance with a predetermined wireless communication method, connects to another apparatus such as the communication apparatus 151 which can perform communication in accordance with the same wireless communication method, and executes data communication. For example, the communication unit 109 has a function as a wireless LAN terminal, and in a case in which a communication unit 156 of the communication apparatus 151 functions as an access point, the communication unit can wirelessly connect to the access point. The establishment of a connection between the communication unit 109 and the communication unit 156 allows the information processing apparatus 101 and the communication apparatus 151 to communicate with each other. Note that when the communication unit 109 is to operate as an access point, it is possible to establish a connection by causing the communication apparatus 151 to operate as a terminal. Additionally, execution of inter-terminal communication is also possible by causing both the information processing apparatus 101 and the communication apparatus 151 to operate as terminals. Note that the communication unit 109 and the communication unit 156 may each include hardware to serve as an access point or a terminal and be formed to permanently execute each function or may have a software capability to dynamically switch between these functions. Also, both the communication unit 109 and the communication unit 156 can operate as terminals and connect to each other via, for example, the access point 131. Note that, for example, a device such as a wireless LAN router can be used as the access point 131. The communication unit 109 and the communication unit 156 may each have the capability to operate in accordance with a wireless communication method by a wireless LAN in compliance with the IEEE802.11 standard series or have the capability to operate in accordance with another wireless communication method. For example, the communication unit 109 and the communication unit 156 may each have the capability to operate in compliance with, for example, a standard such as Bluetooth® (version 3.0 or earlier in one example).

The short-range wireless communication unit 110 is a device that includes a circuit and an antenna for executing data communication by wirelessly connecting the information processing apparatus 101 to another apparatus such as the communication apparatus 151 which is present within a predetermined short range. Note that the short-range wireless communication unit 110 performs communication by a wireless communication method different from that of the communication unit 109. The short-range wireless communication unit 110 can connect to a short-range wireless communication unit 157 of the communication apparatus 151 that operates in accordance with the same wireless communication method. Assume that in this embodiment, the short-range wireless communication unit 110 and the short-range wireless communication unit 157 operate in compliance with the Bluetooth Low Energy (BLE) standard.

The image capturing device 111 is a device that converts an image captured by an image sensor into digital data. The digital data is stored once in the RAM 105, subsequently converted into a predetermined image format based on a program executed by the CPU 103, and saved as image data in the external storage device 106.

The communication apparatus 151 includes, in one example, a ROM 152, a RAM 153, a CPU 154, a print engine 155, the communication unit 156, the short-range wireless communication unit 157, an input interface 158, and an output interface 159. Note that these blocks are connected to each other by using, for example, an internal bus. Although it is shown as if a display unit 160 (external display device) is present outside the communication apparatus 151 in FIG. 1, the display unit 160 may be a display incorporated in the communication apparatus 151. Note that the arrangement of these blocks is merely an example, and the communication apparatus 151 may include blocks other than those shown in FIG. 1. The plurality of blocks shown in FIG. 1 may be integrated into a single block or a single block may be divided into two or more blocks. That is, the communication apparatus 151 can have an arbitrary arrangement within the range in which the processing, which is to be described later, can be executed.

The CPU 154 is a system control unit and controls the overall communication apparatus 151. The RAM 153 is formed from, for example, a DRAM (Dynamic RAM) requiring a backup power supply, in the same manner as the RAM 105. The RAM 153 is also used as the main memory and the work memory of the CPU 154, can be used as a reception buffer for temporarily saving print information received from the information processing apparatus 101, and can be used when saving various kinds of information. The ROM 152 stores permanent data such as control programs and data tables which are to be executed by the CPU 154, an OS program, and the like. In this embodiment, each control program stored in the ROM 152 is used to perform, under the management of the embedded OS stored in the ROM 152, software execution control such as scheduling, task switching, interrupt processing, and the like. The ROM 152 can also be provided with a memory area, such as the setting information of the communication apparatus 151, the management data of the communication apparatus 151, and the like, that stores data required to be held even when power supply is not performed.

The communication unit 156 has the same functions as the above-described communication unit 109 and can communicate with the communication unit 109 by direct communication or indirect communication via the access point 131. The short-range wireless communication unit 157 is a device that can perform short-range wireless communication with the short-range wireless communication unit 110 by using the same wireless communication method (a communication method in compliance with the BLE standard in this embodiment) as that of the short-range wireless communication unit 110 of the information processing apparatus 101.

The print engine 155 performs, based on information saved in the RAM 153 or a print job received from the information processing apparatus 101, image formation on a print medium such as paper by using a print agent such as ink and outputs a print result. At this time, since a print job transmitted from the information processing apparatus 101 has a large transmission data amount and requires high-speed communication, it can be received via the communication unit 156 which can communicate at a higher speed than the short-range wireless communication unit 157.

The input interface 158 is an interface for accepting data inputs and operation instructions from the user and is formed from a physical keyboard, buttons, a touch panel, and the like. The output interface 159 is an interface to perform control to cause the display unit 160 to display data and perform notification of the state of the communication apparatus 151. The display unit display unit 160 is formed from an LED (light emitting diode), LCD (liquid crystal display), and the like, displays data, and notifies the user of the state of the communication apparatus 151. Note that the input interface 158 for accepting an operation from the user and the output interface 159 (and the display unit 160), to be described later, for screen output may be implemented by a single device such as a touch panel. For example, a software keyboard including keys such as numerical value input keys, a mode setting key, an enter key, a cancel key, and a power key can be displayed on the display unit 160 so that an input from the user can be accepted via the display unit 160. Note that the output interface 159 may perform control to cause an output unit (not shown) to present information by sound output and vibration output.

Note that a memory such as an external HDD or an SD card may be mounted to the communication apparatus 151 as an optional device, and the information saved in the communication apparatus 151 may be saved in this memory. Here, although an example of processing sharing between the information processing apparatus 101 and the communication apparatus 151 has been described above, the form of processing sharing is not particularly limited to this, and another form of processing sharing may be used.

Figure 2:
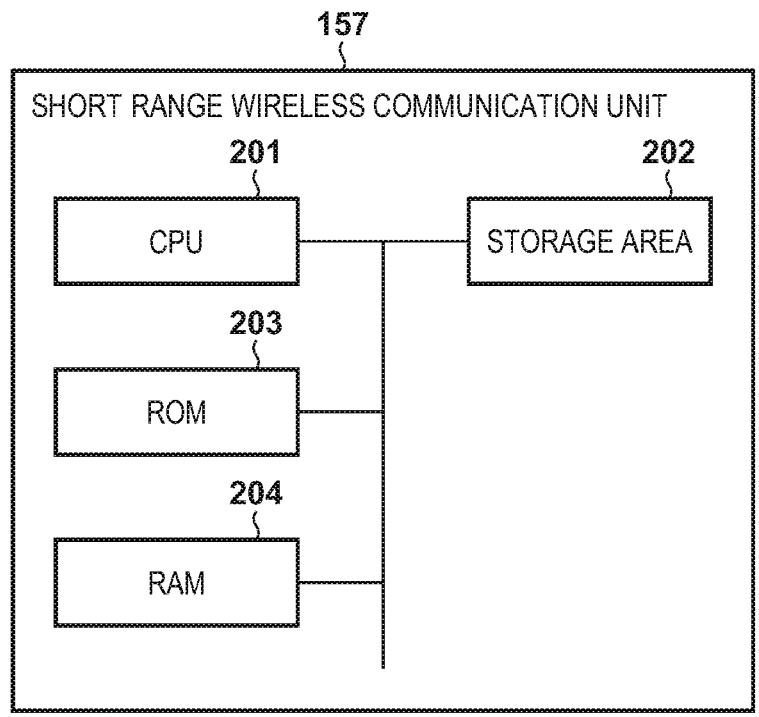
FIG. 2 is a block diagram showing an example of the arrangement of a short-range wireless communication unit.

Details of the short-range wireless communication unit 157 will be described with reference to FIG. 2. The short-range wireless communication unit 157 is a device that includes an arrangement for performing short-range wireless communication with an apparatus such as the information processing apparatus 101. In this embodiment, the short-range wireless communication unit 157 communicates by a wireless communication method in compliance with the BLE standard as described above. Note that the short-range wireless communication unit 157 and the CPU 154 can communicate with each other via a bus interface such as an I2C (Inter-Integrated Circuit), and the CPU 154 can, for example, access the storage area inside the short-range wireless communication unit 157. For example, a CPU 201, a storage area 202, a ROM 203, and a RAM 204 are included inside the short-range wireless communication unit 157. The CPU 201 controls the overall short-range wireless communication unit 157. The ROM 203 stores permanent data such as control programs and data tables which are to be executed by the CPU 201, an OS program, and the like. The RAM 204 is formed from, for example, a DRAM requiring a backup power supply and has the capability to store important data such as program control variables without volatilizing them. The RAM 204 can also be used as the main memory and the work memory of the CPU 201. The storage area 202 is an area that can store information accessible from the CPU 154 or the information processing apparatus 101 via the short-range wireless communication unit 110. Note that the storage area 202 is formed from an arbitrary device capable of storing information, and may be formed, for example, as a part of the RAM 204 or be formed, for example, by a nonvolatile memory separate from the ROM 203 and the RAM 204.

(Processing Procedure)

Processing according to this embodiment will be described next. The processing to be described below is executed by the information processing apparatus 101 and the communication apparatus 151 via the short-range wireless communication unit 110 and the short-range wireless communication unit 157, respectively. Note that the short-range wireless communication unit 110 and the short-range wireless communication unit 157 perform communication in compliance with the BLE standard as described above.

Here, the advertising information used in the BLE standard will be described first. FIG. 7 is an example of the structure of advertising information which is broadcast by the short-range wireless communication unit 157 to the surroundings of the communication apparatus 151.

When power supply is started, the short-range wireless communication unit 157 performs initialization processing and changes to an advertising state. Upon changing to the advertising state, the short-range wireless communication unit 157 periodically broadcasts the advertising information to its surroundings based on an advertising interval. The advertising information is a signal that includes basic header information (identification information and the like for identifying the apparatus which is transmitting the advertising information), and is formed from a header 901 and a payload 902. The information processing apparatus 101 can recognize the presence of the communication apparatus 151 by receiving this advertising information. Furthermore, the information processing apparatus 101 can transmit a BLE connection request to the communication apparatus 151 to connect to the communication apparatus 151 by BLE connection. The header 901 is an area that stores the PDU type of the advertising information and the size information of the payload 902. If the PDU type is ADV_IND or ADV_S-CAN_IND, the short-range wireless communication unit 110 can issue a scan request (SCAN_REQ) to the short-range wireless communication unit 157. Upon receiving the scan request, the short-range wireless communication unit 157 transmits scan response information (SCAN_RSP). The information processing apparatus 101 can receive information in addition to the advertising information from the communication apparatus 151 by receiving the scan response information via the short-range wireless communication unit 110. The payload 902 stores information such as the device name 903 which serves as identification information, installed profile information, connection information 904 for performing BLE connection with the communication apparatus 151, advertising information transmission power (Tx Power) 905, and the like. Note that the communication apparatus identification information 906 may be included in the advertising information. The MAC address of the communication apparatus, the service information of the communication apparatus, the presence/absence of an operation panel (operation screen) included in the communication apparatus, the SSID of the access point in the communication apparatus, the password, and the like correspond as the communication apparatus identification information 906. The scan response information basically has the same structure as the advertising information. The PDU type included in the header 901 of the scan response information is SCAN_RSP, and the information stored in the payload 902 may be information different from the advertising information in accordance with the requirement. Note that the operation panel included in the communication apparatus may be a touch panel, a liquid crystal display, or another form.

In this embodiment, assume that the short-range wireless communication unit 157 changes to the advertising state when the power of the communication apparatus 151 is turned on, and the transmission of the advertising information is started. However, the timing at which the short-range wireless communication unit 157 starts the transmission of the advertising information is not limited to the above-described form, and may be, for example, the timing at which a predetermined operation for enabling the BLE function is performed.

Note that for example, first advertising information is transmitted first by the short-range wireless communication unit 157. It may be arranged so that second advertising information whose contents are different from those of the first advertising information is transmitted by the short-range wireless communication unit 157 when it receives, from the information processing apparatus 101, a response (scan request) to the first advertising information. Here, the second advertising information may be referred to as the scan response information. Assume that, for example, the first advertising information is information that includes the IP address of the communication apparatus 151, the port to be used for printing, information indicating a particular printing service, information related to advertising information transmission power, identification information of the short-range wireless communication unit 157, and the like. Assume that the second advertising information is information that includes the identification information (UUID) of the communication apparatus 151, information (for example, operation panel information indicating whether the apparatus includes the above-described operation panel) related to the functions and hardware provided in the communication apparatus 151, and the like. In this form, for example, a print application is designed to handle the second advertising information. Hence, in the following description, assume that the advertising information handled by the print application is the second advertising information.

The outline of communication by GATT (Generic Attribute Profile) of the BLE standard will be described next. In communication by GATT, the two roles of a client and a server are defined based on the transfer source and the transfer destination of the data. The role of the client is to transmit a request to the server and receive a response from the server. The role of the server is to return a response upon receiving a request from the client. The GATT server is a device that stores data or status information, and the GATT client can execute data read and write to the GATT server. That is, the GATT client can read out the data or cause the GATT server to store the data or the status information by writing the data or the status information in the GATT server. In this embodiment, assume that the information processing apparatus 101 is the GATT client and the communication apparatus 151 is the GATT server.

Figure 3:
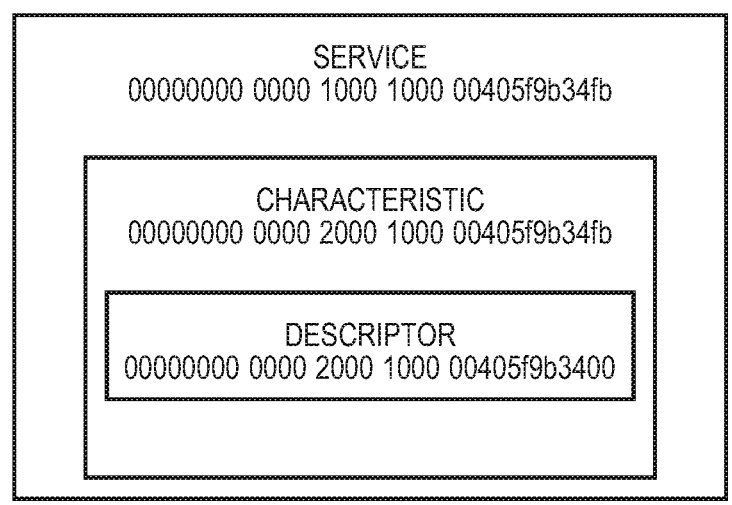
FIG. 3 is a view showing a GATT data format.

GATT data is formed by three elements called a service, a characteristic, and a descriptor. FIG. 3 shows the relationship of these three elements. A service includes at least one or more characteristics, and a characteristic includes a descriptor. Among these, a characteristic is used for holding user data, and separate pieces of information can be held by using a plurality of characteristics. A descriptor holds additional information of the characteristic. Note that a descriptor is not required to be always present. The service, the characteristic, and the descriptor can each set a read/write attribute and a security attribute to the GATT client. A UUID (Universally Unique Identifier) is assigned to each of the service, the characteristic, and the descriptor. The UUID is, for example, a 32-digit hexadecimal number (128 bits) which is expressed in the manner of "550e8400-e29b-41d4-a716-446655440000". The UUID is used as an identifier for uniquely identifying an object in the software. Note that a value defined by the Bluetooth SIG (Special Interest Group) standard is expressed in four digits.

The GATT client can designate a UUID to each service and each characteristic to execute a read/write operation on a value held by the designated characteristic. However, whether the read/write operation can be executed on the value held by the designated characteristic is determined by the read/write attribute set to each of the designated service and characteristic.

The outline of a processing procedure performed until the pairing of the information processing apparatus 101 and the communication apparatus 151 will be described with reference to FIG. 8.

The communication apparatus 151 transmits the advertising information (step S801). Upon receiving the advertising information, the information processing apparatus 101 transmits a scan request (step S802). When the communication apparatus 151 receives the scan request, the communication apparatus transmits a scan response (step S803).

When the user selects the communication apparatus 151 which is the connection target, the information processing apparatus 101 transmits a GATT connection request to the communication apparatus 151 (step S804). Subsequently, a GATT connection is established between the information processing apparatus 101 and the communication apparatus 151 (step S805).

After the GATT connection has been established, the information processing apparatus 101 transmits a PIN code (step S806). If the correct PIN code is transmitted, the pairing processing between the information processing apparatus 101 and the communication apparatus 151 is successful (step S807).

Details of the processing (pairing processing based on BLE) performed between step S805 to step S807 of FIG. 8 will be described with reference to FIGS. 4 to 6 and FIGS. 9A to 9J. In this embodiment, whether accessing a characteristic of the communication apparatus 151 requires a pairing operation is determined in accordance with the security attribute set to this characteristic. If a pairing operation is required by the security attribute set to the characteristic, a read operation cannot be performed in a state in which the pairing operation has not been executed, even if reading of the characteristic is possible. In order to establish a BLE communication corresponding to such a security attribute, a master and a slave used in the BLE communication are required to register each other as a partner apparatus, exchange keys, and save the respective keys. The series of procedures related to this registration, key exchange, and key saving is called "pairing".

Figure 4:
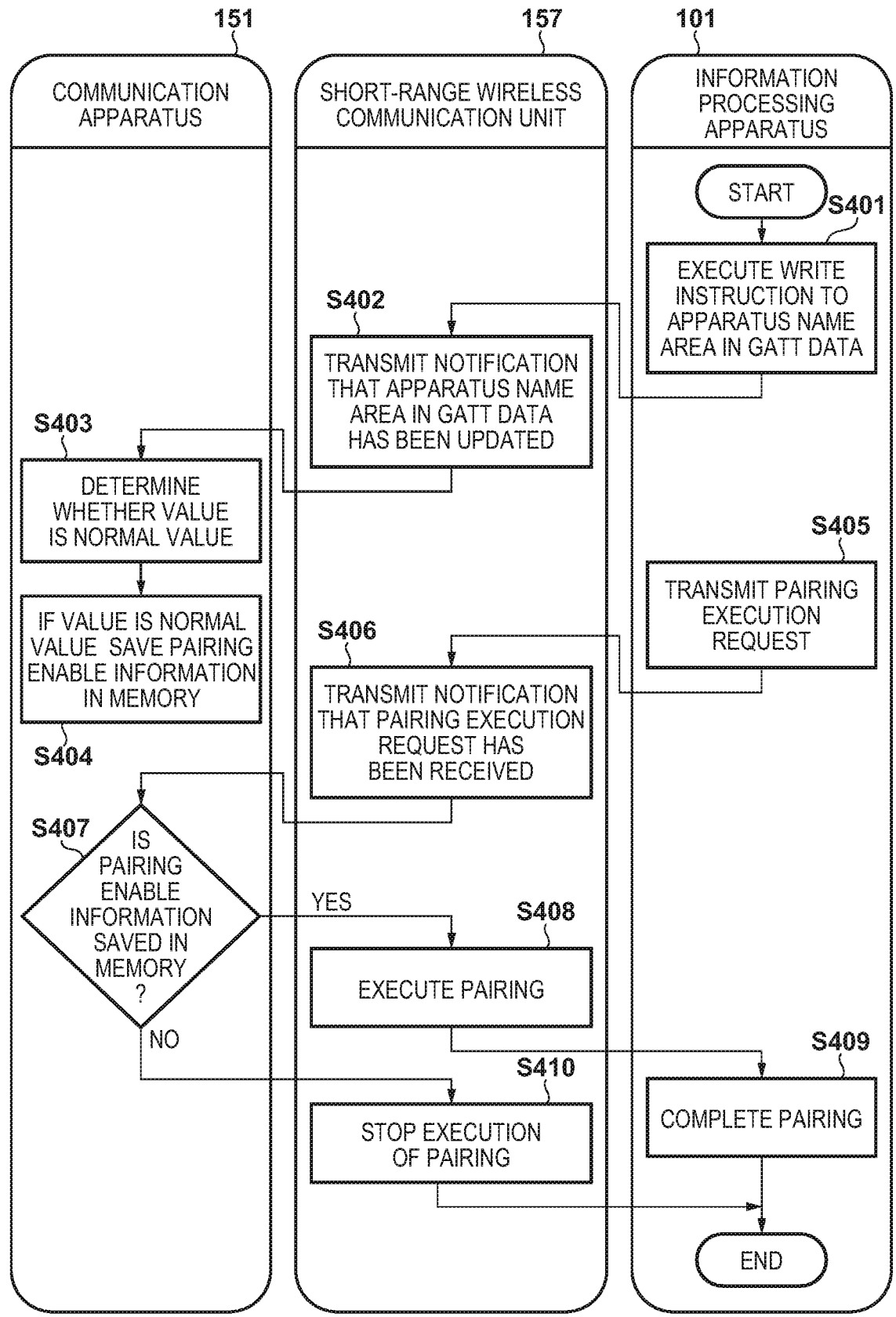
FIG. 4 is a flowchart showing an example of a processing procedure.

An example of the procedure of processing executed by the information processing apparatus 101 and the communication apparatus 151 will be described with reference to FIG. 4. This processing is implemented by, for example, the CPU of each of the information processing apparatus 101 and the communication apparatus 151 reading out and executing various kinds of programs stored in storage areas such as the ROM and the RAM. Note that although the short-range wireless communication unit 157 is included in the communication apparatus 151, the short-range wireless communication unit 157 is indicated separately from the communication apparatus 151 for the sake of descriptive clarity.

First, the information processing apparatus 101 instructs, to the short-range wireless communication unit 157 via the short-range wireless communication unit 110, a write operation on an apparatus name area in the GATT data which is constructed in the short-range wireless communication unit 157 (step S401). The GATT data constructed in the short-range wireless communication unit 157 has, for example, a structure such as that shown in FIG. 5. In the example of FIG. 5, as one of the three characteristics of the service designated by the name "IJ Original", a characteristic that permits the write operation of an apparatus name is present. The information processing apparatus 101 writes the apparatus name in this characteristic which permits the write operation of the apparatus name.

Upon detecting in step S401 that write operation has been executed on the apparatus name area in the GATT data, the short-range wireless communication unit 157 notifies (step S402) the CPU 154 of the communication apparatus 151 of the execution of the write operation on the apparatus name area. The notification of the execution of the write operation on the apparatus name area can be performed by, for example, the CPU 154 generating an interrupt or the CPU 154 polling the status of the short-range wireless communication unit 157. However, this notification need not always be executed by these methods, and another arbitrary method that can provide a trigger for the communication apparatus 151 to perform the following processes may be used.

The communication apparatus 151 obtains the value written in the apparatus name area in the GATT data by the information processing apparatus 101 in step S401 and determines whether the obtained value is a normal value or an abnormal value (step S403). In this embodiment, assume that this determination is performed by determining whether a value according to the format shown in FIG. 6 has been written. The arrangement of FIG. 6 includes a header portion formed by five offset components "A" and one offset component "0", a command portion including four offset components "D" and one offset component "0", and a footer portion including four offset components "B" and one offset component "0". Note that one offset component can correspond, for example, to one byte. The communication apparatus 151 determines that the obtained value is a normal value when the value written in the apparatus name area includes these header portion, command portion, and footer portion and the size of the data portion has been set in the manner shown in FIG. 6. However, the present invention is not limited to this, and another method may be used. For example, the communication apparatus 151 may compare a value input in advance via the input interface 158 and the value written in the apparatus name area in the GATT data, and may determine the obtained value to be a normal value when these values match. Here, there may be a plurality of values that have been input in advance to the communication apparatus 151 via the input interface 158. In this case, the communication apparatus 151 may determine whether one of the plurality of values matches the obtained value. Note that, as shown in the data portion in FIG. 6, some of the values to be input may be designated as arbitrary values by using, for example, a wildcard character. That is, each value to be input may be designated in a format that specifies a predetermined range, and the obtained value may be determined to be a normal value when the obtained value falls within the designated predetermined range. The communication apparatus 151 may determine, without determining whether the value is in accordance with the format, that the obtained value is a normal value by the fact that the value has been written in the apparatus name area in the GATT data.

Subsequently, if it is determined in step S403 that the obtained value is a normal value, the communication apparatus 151 saves, in the RAM 153, pairing enable information (step S404). At this time, the communication apparatus 151 may save the pairing enable information with the information (for example, a value written in the apparatus name area) of the partner apparatus with which the pairing is available. As a result, the communication apparatus 151 can confirm whether the apparatus that was determined to be available for pairing and the apparatus that transmitted the pairing request are the same. On the other hand, if it is determined in step S403 that the obtained value is an abnormal value, the communication apparatus 151 need not save the information in the RAM 153 or may save pairing disable information. Note that the information saving destination need not be the RAM 153, and the information may be stored in the nonvolatile memory and the external storage device. It may also be set so that the pairing enable information is deleted after a predetermined time has elapsed. If the short-range wireless communication unit 157 has an arrangement in which whether to execute the pairing can be set in advance, determination as to whether to execute the pairing can be set to the short-range wireless communication unit 157 at the timing in which the process of step S404 is executed.

The information processing apparatus 101 subsequently transmits a pairing execution request to the short-range wireless communication unit 157 via the short-range wireless communication unit 110 (step S405). That is, after transmitting an instruction to perform writing on the apparatus name area in the GATT data as described above, the information processing apparatus 101 transmits a pairing execution request. Upon receiving the pairing execution request, the short-range wireless communication unit 157 notifies the CPU 154 in the communication apparatus 151 of the reception of the request (step S406). Although this notification is performed by the CPU 154 by generating an interrupt or by the CPU 154 by polling the status of the short-range wireless communication unit 157, the notification may be performed by another method. The communication apparatus 151 determines whether pairing enable information is saved in the RAM 153 (step S407). That is, the communication apparatus 151 determines whether the pairing enable information has been saved in step S404. If the pairing enable information has been saved (YES in step S407), the communication apparatus 151 advances the process to step S408. Otherwise (NO in step S407), the process advances to step S410.

In step S408, upon receiving the notification that the pairing is available from the communication apparatus 151, the short-range wireless communication unit 157 executes the pairing between the information processing apparatus 101 and the communication apparatus 151 (step S408). At this time, the short-range wireless communication unit 157 determines whether the apparatus whose information has been written in the apparatus name area and the apparatus that transmitted the pairing request match, and executes the pairing only when these apparatuses match. That is, the short-range wireless communication unit 157 need not respond to a pairing request from an apparatus different form the apparatus that accessed the GATT data and wrote the normal value in the apparatus name area. Note that this determination can be performed by, for example, extracting the name of the apparatus saved in the RAM 153 in step S404 and determining whether this name and the information of the pairing request transmission source match. This determination may also be performed by extracting the value stored in the apparatus name area in the GATT data and determining whether this value and the information of the pairing request transmission source match. In the latter case, in step S404, the information of the name of the apparatus need not be saved in the RAM 153 or the like. The short-range wireless communication unit 157 can communicate with the CPU 154 and the information processing apparatus 101 as needed when executing the pairing communication.

For example, during the communication process with the short-range wireless communication unit 157, the CPU 154 can perform control so as to cause the display unit 160 in the communication apparatus 151 to display a PIN code. In step S409, the information processing apparatus 101 completes the pairing with the communication apparatus 151 upon receiving a pairing completion response via the short-range wireless communication unit 110. Note that in response to the completion of the pairing, the communication apparatus 151 may delete the pairing enable information which is saved in the RAM 153. On the other hand, in step S410, the short-range wireless communication unit 157 ends the processing related to the pairing after receiving, from the communication apparatus 151, a notification that the pairing is unavailable. The short-range wireless communication unit 157 can communicate with the CPU 154 and the information processing apparatus 101 as needed when ending the processing related to the pairing.

Figure 9D:
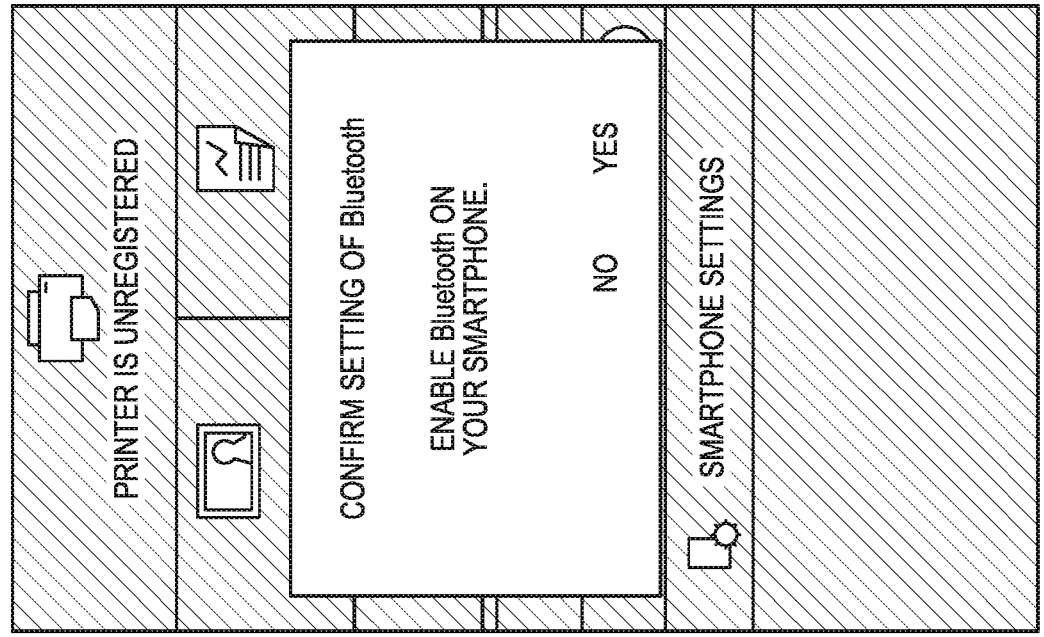

The processing performed on the side of the information processing apparatus when the pairing processing is to be executed will be described next. FIGS. 9A to 9J are schematic views showing screens that are to be displayed on the information processing apparatus 101. FIGS. 9A to 9F and FIG. 9J show screens that are provided by the print application. On the other hand, FIGS. 9G to 9I show Bluetooth setting screens that are provided by a setting application. The setting application is an application program for setting the functions to be executed by the OS. The setting application is, for example, an application program that is installed together with the OS during a series of processes in which the OS is installed in the information processing apparatus 101 or is an application program installed in the information processing apparatus 101 together with the OS when the information processing apparatus 101 arrives as a product. When a pairing instruction is input by the print application, the information processing apparatus 101 activates the setting application and shifts the print application to the background.

First, when the print application is activated in the information processing apparatus 101 by an instruction from the user, the screen shown in FIG. 9A is displayed as the start screen of the print application. If "use Bluetooth function" is selected by the user in FIG. 9A, FIGS. 9B to 9D are displayed sequentially.

Figure 9C:
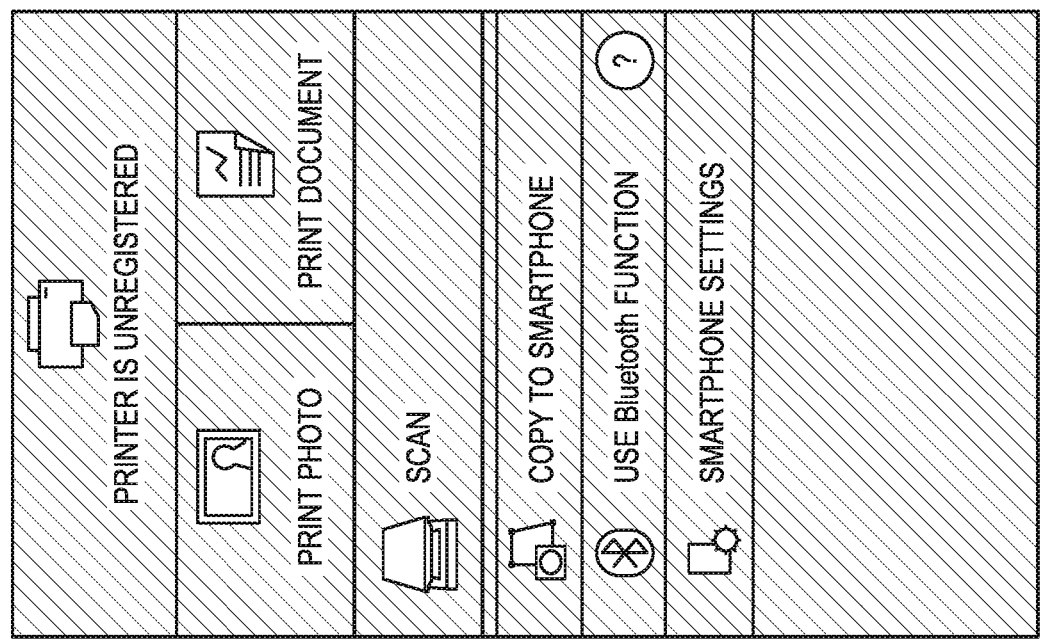

If Bluetooth has been enabled in the information processing apparatus 101 before the "OK" button is pressed in FIG. 9C, FIG. 9E is displayed. Note that FIG. 9D is not displayed in this case. On the other hand, if Bluetooth has not been enabled in the information processing apparatus 101 before the "OK" button is pressed in FIG. 9C, FIG. 9D is displayed. Subsequently, if "YES" is selected, FIG. 9E is displayed.

In FIG. 9E, communication apparatuses that are to be pairing processing candidates are displayed. In FIG. 9E, when a user has selected the communication apparatus which is to be the pairing processing target, the CPU 103 reads out, from the RAM 105, the scan response information corresponding to the selected communication apparatus. The CPU 103 then confirms the information related to the presence/absence of an operation panel which is included in the scan response information that has been read out. This information is represented by two kinds of values, "presence of operation panel" or "absence of operation panel". If information indicating "presence of operation panel" is included in the scan response information, the CPU 103 displays, via the display unit 108, the screen of FIG. 9F which shows the pairing procedure for a printer with an operation panel.

The screen of FIG. 9F displays the procedure for inputting, via the input interface 102 included in the information processing apparatus 101, the PIN code displayed on the operation panel of the communication apparatus 151. When FIG. 9F is displayed, the user can select "next" to display FIG. 9G. The screen of FIG. 9G may be displayed after a predetermined time has elapsed since FIG. 9F has been displayed. The screen of FIG. 9G may also be displayed after a predetermined time has elapsed.

The screen of FIG. 9G displays a message 1001g which is superimposed on the Bluetooth setting screen provided by the setting application. This message is displayed by the print application based on the communication apparatus selected in FIG. 9E. When the user selects the communication apparatus in FIG. 9G, FIG. 9H is displayed.

Note that when the communication apparatus is selected in FIG. 9E, the information processing apparatus 101 transmits a GATT connection request (corresponding to step S804 in FIG. 8). Subsequently, a GATT connection is established between the information processing apparatus 101 and the communication apparatus 151 (corresponding to step S805 in FIG. 8). In addition, when the "next" button is pressed in FIG. 9F, the information processing apparatus 101 instructs a write operation to be executed in the apparatus name area in the GATT data (corresponding to step S401 in FIG. 4).

FIG. 9H is a screen displayed when the user selects, in FIG. 9G, the communication apparatus corresponding to the message 1001g, and is an example of a PIN code input screen. When the user selects, in FIG. 9G, the communication apparatus corresponding to the message 1001g, the information processing apparatus 101 transmits a pairing execution request to the communication apparatus 151 (corresponding to step S405 in FIG. 4). The user inputs, on the PIN code input screen of FIG. 9H, the PIN code displayed on the operation pane of the communication apparatus 151. When the OK button is pressed, the PIN code is transmitted from the information processing apparatus 101 to the communication apparatus 151 (corresponding to step S806 in FIG. 8).

Subsequently, the pairing processing between the information processing apparatus 101 and the communication apparatus 151 succeeds (corresponding to step S409 in FIG. 4 and step S807 in FIG. 8) when the communication apparatus 151 obtains the PIN code and the processing (step S408 shown in FIG. 4) in the communication apparatus 151 is executed.

When the pairing processing has been completed, FIG. 9I is displayed. Note that a message 1001i is superimposed and displayed on a screen provided by the setting application in FIG. 9I. This message 1001i is also generated and displayed by the print application. When the print application detects the completion of the pairing, the print application displays the message 1001i in the manner shown in FIG. 9I. When the user selects the message 1001i, the print application which had been shifted to the background is displayed again.

Note that if information indicating the "absence of operation panel" is included in the scan response information corresponding to the communication apparatus that is selected in FIG. 9E, the screen shown in FIG. 9J is displayed instead of FIG. 9F. FIG. 9J displays "the sheet size", "the sheet count", and "the information indicating which button of the communication apparatus is to be pressed". When FIG. 9J is displayed, the user can select "printing complete" to display FIG. 9G. The PIN code required for at least the pairing operation is printed on a printed material that is printed when the user operates the communication apparatus 151 in accordance with the instructions displayed on FIG. 9J. Note that information other than the PIN code may also be printed.

As described above, according to this embodiment, the information processing apparatus 101 writes, via the short-range wireless communication unit 110, a specific value in the apparatus name area of the short-range wireless communication unit 157. The communication apparatus 151 determines whether the value written in the apparatus name area of the short-range wireless communication unit 157 is a normal value or an abnormal value. If the written value is a normal value, the communication apparatus saves the pairing enable information in the RAM 153. Subsequently, when the information processing apparatus 101 transmits, via the short-range wireless communication unit 110, a pairing execution request to the short-range wireless communication unit 157, the communication apparatus 151 executes the pairing if the pairing enable information is saved in the RAM 153. If the pairing enable information is not saved in the RAM 153, the communication apparatus 151 stops the execution of the pairing processing. As a result, the communication apparatus 151 can stop the execution of the pairing processing when a pairing execution request is received from an unexpected apparatus. When a pairing execution request has been received from a valid user, the communication apparatus 151 can execute the pairing processing.

Note that this embodiment described a method in which the communication apparatus 151 restricts the partner apparatus with which it is to execute the Bluetooth pairing processing. However, the above described method is applicable to other similar communication standards. That is, in response to another apparatus writing a value in a predetermined area in the data which is accessible from the other apparatus, the communication apparatus 151 can perform control so as to accept an arbitrary predetermined processing execution request related to wireless communication. In addition, the data which is accessible from the other apparatus need not be the GATT data but may be arbitrary data.

Furthermore, this embodiment has described that the short-range wireless communication unit writes a data value in a predetermined area in the GATT data and executes the subsequent predetermined processing. However, the present invention is not limited to this. For example, in response to the data value being written in the predetermined area in the GATT data by the short-range wireless communication unit, the communication unit may execute predetermined processing for wireless communication. For example, it may be set so that the pairing processing complying with Bluetooth version 3.0 or the like is performed in response to the data value being written the predetermined area in the GATT data by BLE.

According to the present invention, it is possible to appropriately restrict a partner apparatus that is to serve as the connection target.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126520, filed Jun. 28, 2017, which is hereby incorporated by reference herein in its entirety.

What is claimed is:

1. A communication apparatus that can perform wireless communication with an information processing apparatus, comprising:
at least one processor causing the communication apparatus to act as:
a communication unit configured to perform wireless communication based on a specific standard; and
a saving control unit configured to save specific data that includes a specific area defined by the specific standard and an original area that is different from the specific area,
wherein in a case where the communication unit receives a write instruction for writing first information to the original area from the information processing apparatus, the saving control unit determines whether the first information is in a predetermined format, and
wherein in a case where the communication unit receives a request for processing relating to a registration between the information processing apparatus and the communication apparatus after the saving control unit determines that the first information is in the predetermined format and saves the first information in the original area, the processing relating to the registration between the information processing apparatus and the communication apparatus is performed.

2. The communication apparatus according to claim 1, wherein the saving control unit determines whether a value of a name of the communication apparatus obtained as the first information is in the predetermined format that has a predetermined value and a predetermined size.

3. The communication apparatus according to claim 1, wherein in a case where the saving control unit determines that the first information is in the predetermined format and a PIN code written from the information processing apparatus and a PIN code held in the communication apparatus match, the processing related to the registration between the information processing apparatus and the communication apparatus is performed.

4. The communication apparatus according to claim 1, wherein, if the processing relating to the registration has been performed, the information processing apparatus becomes able to read a first characteristic in the specific data, and if the processing relating to the registration has not been performed, the information processing apparatus is not able to read the first characteristic in the specific data.

5. The communication apparatus according to claim 1, wherein the communication unit performs the wireless communication based on the Bluetooth standard as the specific standard.

6. The communication apparatus according to claim 1, wherein the specific data is Generic Attribute Profile (GATT) data of Bluetooth Low Energy (BLE) standard.

7. The communication apparatus according to claim 6, wherein the GATT data includes a plurality of characteristics.

8. An information processing apparatus that can perform wireless communication with a communication apparatus, comprising:
at least one processor causing the information processing apparatus to act as:
a communication unit configured to perform wireless communication based on a specific standard; and
a control unit configured to control the communication unit,
wherein the control unit controls the communication unit so as to execute a write instruction for writing first information to an original area included in specific data, wherein the specific data is saved by the communication apparatus, and the specific data also includes a specific area that is defined by the specific standard and that is different from the original area, and
after the first information according to a predetermined format is written to the original area and the first information is saved in the original area, the control unit controls the communication unit so as to transmit, to the communication apparatus, a request for processing relating to a registration between the information processing apparatus and the communication apparatus, and the processing relating to the registration between the information processing apparatus and the communication apparatus is performed.

9. The information processing apparatus according to claim 8, wherein the control unit controls the communication unit so as to write, as the first information, a value of a name of the communication apparatus that is in the predetermined format having a predetermined value and a predetermined size.

10. The information processing apparatus according to claim 8, wherein, if the processing relating to the registration has been performed, the information processing apparatus becomes able to read a first characteristic in the specific data, and if the processing relating to the registration has not been performed, the information processing apparatus is not able to read the first characteristic in the specific data.

11. The information processing apparatus according to claim 8, wherein the communication unit performs the wireless communication based on the Bluetooth standard as the specific standard.

12. The information processing apparatus according to claim 8, wherein the specific data is Generic Attribute Profile (GATT) data of Bluetooth Low Energy (BLE) standard.

13. The information processing apparatus according to claim 12, wherein the GATT data includes a plurality of characteristics.

14. A control method for a communication apparatus that can perform wireless communication with an information processing apparatus based on a specific standard and saves specific data that includes a specific area defined by the specific standard and an original area that is different from the specific area, the method comprising:

in a case where a write instruction for writing first information to the original area is received from the information processing apparatus, determining whether the first information is in a predetermined format, and in a case where a request for processing relating to a registration between the information processing apparatus and the communication apparatus is received after it is determined that the first information is in the predetermined format and the first information is saved in the original area, performing the processing relating to the registration with the information processing apparatus.

15. A control method for an information processing apparatus that can perform wireless communication with a communication apparatus based on a specific standard, the method comprising:

executing a write instruction for writing first information to an original area included in specific data, wherein the specific data is saved by the communication apparatus, and the specific data also includes a specific area that is defined by the specific standard and that is different from the original area; and in a case where the first information is in a predetermined format and after the first information is saved in the original area, transmitting, to the communication apparatus, a request for processing relating to a registration between the information processing apparatus and the communication apparatus, and the processing relating to the registration between the information processing apparatus and the communication apparatus is performed.

* * * * *